United States Patent [19]

Small, Jr. et al.

[11] Patent Number: 5,254,610

[45] Date of Patent: Oct. 19, 1993

[54] POLYESTER/POLYCARBONATE BLENDS CONTAINING PHOSPHITES

[75] Inventors: James D. Small, Jr., Blountville; Michael L. Cassell, Kingsport; A. James Cox, Kingsport; Michael J. Keegan, Kingsport; W. Paul Bell, Jonesborough, all of Tenn.

[73] Assignee: Eastman Kodak Company, Rochester, N.Y.

[21] Appl. No.: 739,561

[22] Filed: Aug. 2, 1991

[51] Int. Cl.$^5$ .................. C08K 5/51; C08K 5/52
[52] U.S. Cl. .................. 524/120; 524/128; 524/151; 524/153
[58] Field of Search ........... 524/120, 128, 153, 147, 524/152, 151

[56] References Cited

U.S. PATENT DOCUMENTS

| | | | |
|---|---|---|---|
| 3,822,225 | 7/1974 | Braddon et al. | 524/147 |
| 4,088,709 | 5/1978 | Seymour et al. | 524/120 |
| 4,188,314 | 2/1980 | Fox et al. | 260/37 |
| 4,348,308 | 9/1982 | Minagawa et al. | 524/151 |
| 4,391,954 | 7/1983 | Scott | 525/439 |
| 4,661,545 | 4/1987 | Bruls et al. | 524/151 |
| 4,680,371 | 7/1987 | Rosenfeld et al. | 524/151 |
| 4,762,873 | 8/1988 | Miyauchi et al. | 524/147 |
| 4,786,692 | 11/1988 | Allen et al. | 525/439 |
| 4,956,407 | 9/1990 | Funasaki | 524/120 |
| 5,141,975 | 8/1992 | Enlow | 524/128 |

FOREIGN PATENT DOCUMENTS

| | | |
|---|---|---|
| 0320652 | 6/1989 | European Pat. Off. |
| 0320658 | 6/1989 | European Pat. Off. |
| 2270653 | 11/1987 | Japan |
| 1557266 | 12/1979 | United Kingdom |
| 9117209 | 11/1991 | World Int. Prop. O. |

*Primary Examiner*—Paul R. Michl
*Assistant Examiner*—Tae H. Yoon
*Attorney, Agent, or Firm*—Betty J. James; William P. Heath, Jr.

[57] ABSTRACT

The addition of selected combinations of aliphatic and aromatic phosphite compounds to polyester or copolyester blends with polycarbonate results in unexpected improvements to the properties of resulting molding compositions. The molding compositions comprise:

(a) 10-90% by weight of a polyester or a copolyester, comprising:
  repeat units from at least one aromatic, aliphatic, or alicyclic dicarboxylic acid, wherein the aromatic portion of said aromatic dicarboxylic acid has 6-20 carbon atoms, and wherein the aliphatic or alicyclic portion of said aliphatic or alicyclic dicarboxylic acid has 3-20 carbon atoms, and
  repeat units from at least one aliphatic glycol having 2-20 carbon atoms;
(b) 90-10% by weight of an aromatic polycarbonate of 4,4-isopropylidenediphenol (bisphenol-A); and
(c) 0.1 to about 2% by weight of a combination of aliphatic and aromatic phosphite compounds.

3 Claims, No Drawings

POLYESTER/POLYCARBONATE BLENDS CONTAINING PHOSPHITES

FIELD OF THE INVENTION

This invention relates to polyester/polycarbonate blends with phosphite compounds as additives. The blends provide unexpected thermal stability and reduction of the splay forming tendency during the injection molding process.

BACKGROUND OF THE INVENTION

In the injection molding process, a polymer can be subjected to high temperatures for extended periods of time. Since many of the mechanical and toughness properties of the molded article depend on the molecular weight of the polymer, it is desirable for the polymer to have excellent melt stability or retention of molecular weight during melt processing. Polycarbonates are a class of polymers which exhibit a relatively high retention of molecular weight when injection molded. A known method for maintaining high molecular weight during the processing of polyesters, copolyesters, and blends thereof is to compound selected antioxidants, one of which is usually a phosphite, into the formulation.

U.S. Pat. No. 4,391,954 by Scott, dated Jul. 5, 1983, describes a compatible composition consisting essentially of (a) a nonhalogenated aromatic polycarbonate derived from bisphenol-A and (b) a polyester component consisting of amorphous polyester solely derived from 1,4 cyclohexanedimethanol and a mixture of iso- and terephthalic acids.

U.S. Pat. No. 4,786,692 by Allen, et al, dated Nov. 22, 1988, describes a thermoplastic composition comprising a blend of an aromatic polycarbonate and a copolyester derived from a glycol portion comprising 1,4 -cyclohexanedimethanol and ethylene glycol present in molar ratios of 1:4 to 4:1, respectively, and an acid portion comprising an aromatic dicarboxylic acid selected from terephthalic acid, isophthalic acid, and mixtures thereof.

U.S. Pat. No. 4,188,314 by Fox et al. dated Feb. 12, 1980, describes a shaped article comprising an aromatic polycarbonate and a thermoplastic polyester derived from 1,4-cyclohexanedimethanol and a mixture of iso- and terephthalic acids.

EPO Application No. 88119330, Publication Number 0 320 658, date filed, Nov. 21, 1988, describes an admixture of an aromatic polycarbonate with an anti-yellowing effective amount of a certain phosphite.

Many of these disclosures include the incorporation of stabilizers in the description of the invention; however, they do not disclose the use and unexpected benefits of combinations of aliphatic and aromatic phosphite compounds.

SUMMARY OF THE INVENTION

The thermoplastic molding compositions of the invention comprise:
(a) 10-90% by weight of a polyester or a copolyester, comprising
    repeat units from at least one aromatic, aliphatic, or alicyclic dicarboxylic acid, wherein the aromatic portion of said aromatic dicarboxylic acid has 6-20 carbon atoms, and wherein the aliphatic or alicyclic portion of said aliphatic or alicyclic dicarboxylic acid has 3-20 carbon atoms, and
    repeat units from at least one aliphatic glycol having 2-20 carbon atoms;
(b) 90-10% by weight of an aromatic polycarbonate of 4,4 -isopropylidenediphenol (bisphenol-A); and
(c) 0.1 to about 2% by weight of a combination of aliphatic and aromatic phosphite compounds.

The composition of this invention is advantageous in that it provides unexpected thermal stability and reduction of the splay forming tendency during injection molding. This composition is useful in the injection molding applications that require better chemical and stress crack resistance, better resistance to sterilization by gamma radiation, and improved processability than that afforded by use of polycarbonate alone. The composition is particularly useful for improved melt stability and retention of molecular weight when subjected to high temperatures for an extended period of time.

DESCRIPTION OF THE INVENTION

It has been discovered that combinations of aliphatic and aromatic phosphite compounds, when added to polyester or copolyester blends with polycarbonate, show unexpected and unobvious improvement in the thermal melt stability and in the splaying tendencies of the blends.

The thermoplastic molding compositions of the invention comprise:
(a) 10-90% by weight of a polyester or a copolyester, comprising
    repeat units from at least one aromatic, aliphatic, or alicyclic dicarboxylic acid, wherein the aromatic portion of said aromatic dicarboxylic acid has 6-20 carbon atoms, and wherein the aliphatic or alicyclic portion of said aliphatic or alicyclic dicarboxylic acid has 3-20 carbon atoms, and
    repeat units from at least one aliphatic glycol having 2-20 carbon atoms;
(b) 90-10% by weight of an aromatic polycarbonate of 4,4 -isopropylidenediphenol (bisphenol-A); and
(c) 0.1 to about 2% by weight of a combination of aliphatic and aromatic phosphite compounds.

The dicarboxylic acid portion of the polyesters and copolyesters useful in this invention may contain 3 to 20 carbon atoms and may consist of units of aromatic, aliphatic, or alicyclic dicarboxylic acids or combinations of these dicarboxylic acids. Examples of useful aliphatic dicarboxylic acids are malonic, succinic, glutaric, adipic, pimelic, suberic, azelaic, sebacic, dodecanedioic, 1,4-, 1,5-, and 2,6-decahydronaphthalenedicarboxylic acid, and cis- or trans-1,4-cyclohexanedicarboxylic acid. Examples of useful aromatic dicarboxylic acids are terephthalic acid, isophthalic acid, 4,4'-biphenyldicarboxylic, trans 3,3'-and trans 4,4 stilbenedicarboxylic acid, 4,4'-dibenzyldicarboxylic acid, 1,4-, 1,5'-, 2,3-, 2,6, and 2,7-naphthalenedicarboxylic acid. The preferred dicarboxylic acids are terephthalic and isophthalic acid or mixtures thereof.

The glycol portion of the polyesters and copolyesters useful in this invention may consist of aliphatic glycols containing 2 to 20 carbon atoms, preferably 2 to 8 carbon atoms. Examples of useful glycols are ethylene glycol, 1,2 -propylene glycol, 1,3-propanediol, 1,4-butanediol, 1,5-pentanediol, 1,6-hexanediol, 1,2-, 1,3-, 1,4-cyclohexanedimethanol, neopentyl glycol, and 2,2,4,4 tetramethyl-1,3-cyclobutanediol. The preferred glycols are 1,4-cyclohexanedimethanol, ethylene glycol, or mixtures thereof.

The preferred polyesters of the invention comprise repeat units from poly(ethylene terephthalate) or poly(1,4-cyclohexylenedimethylene terephthalate).

Preferred copolyesters of the invention comprise repeat units from terephthalic acid, isophthalic acid or mixtures thereof and 1,4-cyclohexanedimethanol.

Other preferred copolyesters of the invention comprise repeat units from terephthalic acid and 1,4-cyclohexanedimethanol, ethylene glycol, or mixtures thereof.

The polyesters and copolyesters of the present invention are prepared by conventional polycondensation processes well known in the art, such as the process described in U.S. Pat. No. 2,901,466 dated Aug. 25, 1959. These include direct condensation of the acid(s) with the glycol(s) or by ester interchange using lower alkyl esters.

The inherent viscosity of the polyester or copolyester of the present invention may range from about 0.4 to about 1.0 dl/g, the preferred range being about 0.6 to about 0.8 dl/g, at 25° C. in a solvent mixture consisting of 60% by weight phenol and 40% by weight tetrachloroethane.

The polycarbonate portion of the blend consists of the polycarbonate of 4,4'-ispropylidenediphenol (bisphenol A) and has a relative viscosity ranging from about 1.1 to about 1.5 as measured at 25° C. in methylene chloride. The polycarbonate portion of the invention is prepared in the melt, in solution, or by interfacial polymerization techniques well known in the art. Many such polycarbonates are commercially available and are normally made by reacting bisphenol A with phosgene or dibutyl carbonate or diphenyl carbonate, etc.

The polyester/polycarbonate blends of the invention may be made by conventional melt processing techniques. For example, pellets of the polyester may be mixed with pellets of the polycarbonate and subsequently melt blended in either a single or twin screw extruder to form a homogenous mixture.

The phosphite compounds of this invention are present in a ratio of 1:4 to 4:1 by weight of aliphatic to aromatic phosphite. It is intended that the term "phosphite" includes mono-, di-, and other polyphosphites.

Particularly preferred phosphites include Weston 619, a product of General Electric Specialty Chemicals Company, having the following structure:

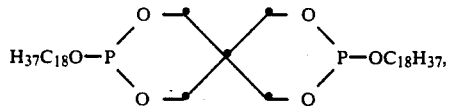

Ultranox 626, an aromatic phosphite produced by General Electric Specialty Chemicals Company, having the following structure:

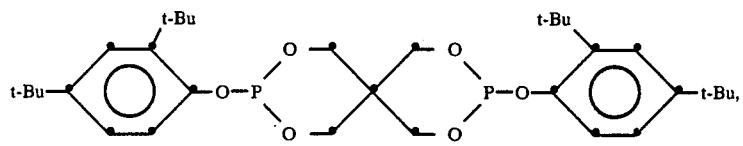

and Irgafos 168, an aromatic phosphite produced by Ciba-Geigy Corp., having the following structure:

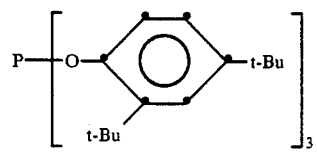

Another example of an aromatic phosphite compound useful within the context of this invention is Ultranox 633, a General Electric Specialty Chemical Company developmental compound.

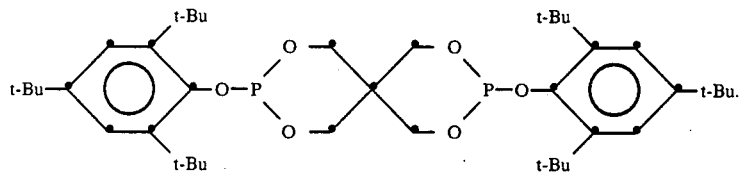

Other commercially available examples of useful aliphatic phosphites are Weston 618 and Weston TSP, both produced by General Electric Specialty Chemicals Company.

In addition, the materials of this invention may contain common additives such as colorants, mold release agents, UV stabilizers, fillers, and impact modifiers. The impact modifiers may be added to the subject compositions in conventional amounts of from 0.1 to 25% by weight of the overall composition and preferable in amounts from 0.1 to 10% by weight of the overall composition. Examples of typical commercially available impact modifiers well known in the art and useful in this invention include, but are not limited to, ethylene/propylene terpolymers, styrene based block copolymeric impact modifiers, and various acrylic core/shell type impact modifiers.

Reinforcing materials are also useful in the molding compositions of this invention. The reinforcing materials may include carbon filaments, silicates, mica, clay, talc, titanium dioxide, Wollastonite, glass flakes, glass beads and fibers, and polymeric fibers and combinations thereof.

The preferred reinforcing materials are of glass, and it is further preferred to use fibrous glass filaments, mixtures of glass and talc, glass and mica, and glass and polymeric fibers.

The inherent viscosities of the polyesters are determined in 60/40 (wt/wt) phenol/tetrachloroethane at 25° C. and at a concentration of 0.5 g/100 ml. Since the polycarbonate is degraded by this solvent system, the relative viscosities of bisphenol A polycarbonate are measured at 25° C. using 0.5 g of polymer per 100 ml of a solvent consisting of methylene chloride.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise noted. All percentages are by weight unless otherwise indicated.

EXAMPLE 1

Blends of poly(1,4-cyclohexylenedimethylene terephthalate) (PCT) and bisphenol-A polycarbonate (50:50 blend ratio) were compounded, along with combinations of the various phosphite compounds cited, using a Brabender single screw extruder operated at 300° C. The pelletized samples were then dried at 90° C. under vacuum for 16 hours. The dried samples were then heated to 300° C. using a Tinius Olsen melt indexer, and samples were removed at 5 minute intervals. The samples extruded at each time interval were then subjected to a solvent extraction to separate the polyester component from the blend. The solution containing the polyester extracted at each time interval was then characterized by using size exclusion chromatography SEC) to determine the molecular weight distribution (MWD) along with average molecular weights. These data are shown in Table 1. The percentage change in the weight average molecular weight (Mw) after 15 minutes at 300° C. is shown for each sample in Table 2. It is clear from these data that combinations of stabilizers, comprised of an aliphatic phosphite and at least one aromatic phosphite, were more effective at controlling the PCT molecular weight decrease in the blends during the test.

These unexpected results can be appreciated by comparing, for example, the data from samples one through six of Table 2, which all have a total of 0.6 wt % stabilizer. Using 0.6 wt % of each stabilizer alone (samples three, four and five) gives molecular weight losses of 26-35%, which are undesirable. Samples one, two and six show the effects of mixtures of aliphatic and aromatic phosphites at a total level of 0.6 wt %. Surprisingly, the losses in molecular weight are much less for these mixtures, as low as 7%. Also shown in Table 2 is an example of a mixed stabilizer composition at a total level of only 0.3% (sample seven). Unexpectedly, the combination of stabilizers at the 0.3% level provides stability as good as or better than can be achieved with any of the individual stabilizers at the 0.6% level.

EXAMPLE 2

Pellet/pellet blends of PCT and Makrolon 2608 polycarbonate (a product of Mobay Chemical Corp.), a core-shell acrylic impact modifier, a non phosphorous based antioxidant, a UV absorber, a mold release agent and various dyes and pigments for coloring the blend were compounded on a 40 mm twin screw extruder. Blends were prepared containing Weston 619, Ultranox 626, and Irgafos 168 in a phosphite stabilizer package such that the compositions contained 0.6% of any one phosphite, 0.3% each of any two phosphites, 0.2% each of all three phosphites and combinations in between.

After compounding, the melt blends were dried at 230° F. (110° C.) for molding on a Toyo 13 oz. injection molding machine using the following operating conditions:

| Temperature settings, °F. | | |
|---|---|---|
| Nozzle | | 625 |
| Front Zone | | 600 |
| Center Zone | | 590 |
| Rear Zone | | 575 |
| Mold | | 90 |
| Pressures, psig | | |
| Pack | | 1900 |
| Hold | | 1000-800 |
| Back | | 75 |
| Cycle, sec | | |
| Pack | | 2 |
| Hold | | 4 |
| Cooling | | 3 |
| Open | | 70 |
| Total | | 86.5 |
| Injection Speed | | |
| 1 | 25% | 2.4 |
| 2 | 25% | 1.7 |
| In./Sec/Percent | | |
| 3 | 25% | 1.25 |
| 4 | 25% | 1.00 |
| 5 | 25% | 0.5 |
| Screw Speed %/rpm | 25% | 0.5 |
| Shot Size, in. | | 2.4 |
| Cushion, in. | | 0.500 |
| Trans. Pressure, psi | | 0.775 |

A melt temperature of 625°-630° F. (329°-332° C.) was achieved using these conditions. Plaques (4×4 in.) molded at these conditions were judged for splay. Splay appears as imperfections in molded parts as lines and voids that can be caused by the evolution of gases from the polymer blend. Splay was found in the series of samples ranging from no splay to very slight to light splay, which showed up as lines in the plaque surface, to very heavy splay in which the molded plaque was rough and had the appearance of being foamed.

Blends with 0.4% Irgafos 168, 0.1% Weston 619 and 0.1% Ultranox 626; 0.2% each of Irgafos 168, Weston 619 and Ultranox 626; and 0.3% each of Irgafos 168 and Weston 619 showed the least splay in the order listed. Blends containing 0.6% of either Weston 619 or Irgafos 168 alone showed significantly more splay. A blend was also prepared containing all of the components except that 0.1% each of Irgafos 168, Weston 619 and Ultranox 626 was used. This blend was found to give no splay when molded at the same conditions (Table 3).

The center heating zone temperature setting of the molding machine was raised to 600° F. for second set of moldings to achieve a consistent melt temperature of about 635° F. (335° C.), with all other conditions remaining the same. Examination of the plaques molded at this temperature showed that the blends containing 0.4% Irgafos 168, 0.1% Ultranox 626, and 0.1% Weston 619 or 0.1% each of the three phosphites had very little or no splay (Table 4). A blend containing 0.6% Ultranox 626 as the only phosphite, in particular, had significantly more splay. These results demonstrate the synergistic effect that the combination of aliphatic and aromatic phosphites has on preventing splay during molding.

Similar results were seen with 0.2% each of Irgafos 168, Weston 619, and Ultranox 626 in a similar blend in which a copolyester, consisting essentially of repeat units of terephthalic acid with ethylene glycol and 1,4

-cyclohexanedimethanol, is used instead of PCT when molded at similar melt temperatures.

TABLE 1

| Sample Number | Stabilizer[c] System | Tinius Olsen SEC Data[a][b] (300° C.) | | |
|---|---|---|---|---|
| | | Mn | Mw | Mz |
| 1 | 0.3% AL-1 + 0.3% AR-1 | 25,530 | 43,900 | 67,200 |
| 1A | 0.3% AL-1 + 0.3% AR-1 | 25,920 | 42,060 | 59,430 |
| 1B | 0.3% AL-1 + 0.3% AR-1 | 26,040 | 42,410 | 60,940 |
| 1C | 0.3% AL-1 + 0.3% AR-1 | 24,590 | 40,740 | 59,800 |
| 2 | 0.3% Al-1 + 0.3% AR-2 | 23,800 | 41,150 | 61,550 |
| 2A | 0.3% Al-1 + 0.3% AR-2 | 24,400 | 38,880 | 54,330 |
| 2B | 0.3% Al-1 + 0.3% AR-2 | 23,800 | 38,090 | 52,930 |
| 2C | 0.3% Al-1 + 0.3% AR-2 | 22,600 | 35,900 | 49,540 |
| 3 | 0.6% AR-1 | 25,874 | 42,814 | 61,182 |
| 3A | 0.6% AR-1 | 22,600 | 37,120 | 53,850 |
| 3B | 0.6% AR-1 | 19,340 | 30,500 | 42,570 |
| 3C | 0.6% AR-1 | 16,220 | 27,700 | 56,760 |
| 4 | 0.6% AR-2 | 24,875 | 38,763 | 53,725 |
| 4A | 0.6% AR-2 | 20,750 | 33,110 | 46,730 |
| 4B | 0.6% AR-2 | 18,550 | 29,850 | 41,780 |
| 4C | 0.6% AR-2 | 17,410 | 27,010 | 37,020 |
| 5 | 0.6% AL-1 | 24,934 | 43,756 | 65,414 |
| 5A | 0.6% AL-1 | 23,640 | 39,900 | 57,660 |
| 5B | 0.6% AL-1 | 19,600 | 34,770 | 49,250 |
| 5C | 0.6% AL-1 | 19,810 | 32,330 | 45,140 |
| 6 | 0.1% AR-1 + 0.1% AR-2 + 0.1% AL-1 | 22,751 | 38,763 | 55,757 |
| 6A | 0.1% AR-1 + 0.1% AR-2 + 0.1% AL-1 | 22,320 | 35,920 | 51,600 |
| 6B | 0.1% AR-1 + 0.1% AR-2 + 0.1% AL-1 | 19,700 | 32,740 | 47,630 |
| 6C | 0.1% AR-1 + 0.1% AR-2 + 0.1% AL-1 | 17,610 | 28,180 | 39,450 |
| 7 | 0.2% AR-1 + 0.2% AR-2 + 0.2% AL-1 | 21,203 | 35,327 | 51,482 |
| 7A | 0.2% AR-1 + 0.2% AR-2 + 0.2% AL-1 | 20,760 | 34,720 | 49,710 |
| 7B | 0.2% AR-1 + 0.2% AR-2 + 0.2% AL-1 | 19,060 | 31,340 | 44,200 |
| 7C | 0.2% AR-1 + 0.2% AR-2 + 0.2% AL-1 | 16,770 | 28,440 | 40,060 |

[a]This data is reported in PCT equivalents.
[b]Samples labeled A, B, and C are samples taken after 5, 10, and 15 minutes, respectively, in the Tinius Olsen Melt Indexer.
[c]The stabilizers used are labeled as follows:
AL-1 = Weston 619
AR-1 = Ultranox 626, and
AR-2 = Irgafos 168.

TABLE 2

| Sample Number | Total Stabilizer Conc., (Wt %) | Ultranox 626 (AR-1) | Irgafos 168 (AR-2) | Weston 619 (AL-1) | Change in MW after 15 min. @ 300° C.[a] (%) |
|---|---|---|---|---|---|
| 1 | 0.6 | 0.3 | — | 0.3 | −7.0 |
| 2 | 0.6 | — | 0.3 | 0.3 | −13.0 |
| 3 | 0.6 | 0.6 | — | — | −35.0 |
| 4 | 0.6 | — | 0.6 | — | −30.0 |
| 5 | 0.6 | — | — | 0.6 | −26.0 |
| 6 | 0.6 | 0.2 | 0.2 | 0.2 | −19.0 |

TABLE 2-continued

| Sample Number | Total Stabilizer Conc., (Wt %) | Ultranox 626 (AR-1) | Irgafos 168 (AR-2) | Weston 619 (AL-1) | Change in MW after 15 min. @ 300° C.[a] (%) |
|---|---|---|---|---|---|
| 7 | 0.3 | 0.1 | 0.1 | 0.1 | −27.0 |

[a]The change in Mw after 15 minutes at 300° C. was calculated by using the data given in Table 1 and contained herein.

TABLE 3

STABILIZERS AND SPLAY FOR PCT/PC BLENDS MOLDED AT −630° F.

| % Weston 619 Alkyl Phosphite (I) | % Ultranox 626 Aryl Phosphite (II) | % Irgafos 168 Aryl Phosphite (III) | Total Phosphite | Splay When Molded |
|---|---|---|---|---|
| 0.6 | 0 | 0 | 0.6 | Heavy |
| 0 | 0 | 0.6 | 0.6 | Heavy |
| 0.3 | 0 | 0.3 | 0.6 | Light |
| 0.2 | 0.2 | 0.2 | 0.6 | Light |
| 0.1 | 0.1 | 0.4 | 0.6 | None |
| 0.1 | 0.1 | 0.1 | 0.3 | None |

TABLE 4

STABILIZERS AND SPLAY FOR PCT/PC BLENDS MOLDED AT −635° F.

| % Weston 619 Alkyl Phosphite (I) | % Ultranox 626 Aryl Phosphite (II) | % Irgafos 168 Aryl Phosphite (III) | Total Phosphite | Splay When Molded |
|---|---|---|---|---|
| 0 | 0.6 | 0 | 0.6 | Moderate |
| 0.1 | 0.1 | 0.4 | 0.6 | Light |
| 0.1 | 0.1 | 0.1 | 0.3 | Light |

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. A thermoplastic molding composition comprising:
   (a) 10-90% by weight of a polyester or a copolyester, comprising: repeat units from at least one aromatic, aliphatic, or alicyclic dicarboxylic acid, wherein the aromatic portion of said aromatic dicarboxylic acid has 6-20 carbon atoms, and wherein the aliphatic or alicyclic portion of said aliphatic or alicyclic dicarboxylic acid has 3-20 carbon atoms, and repeat units from at least one aliphatic glycol having 2-20 carbon atoms;
   (b) 90-10% weight of an aromatic polycarbonate of 4,4-isopropylidenediphenol (bisphenol-A); and
   (c) 0.1 to about 2% by weight of a combination of aliphatic diphosphite and aromatic phosphite compounds,
   wherein said aliphatic diphoshite has the following formula:

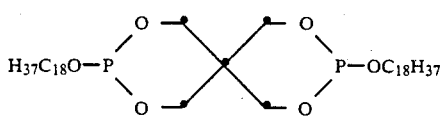

and wherein said aromatic phosphite has the following formula:

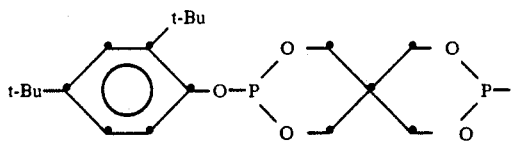

2. A thermoplastic molding composition comprising:
(a) 10–90% by weight of a polyester or a copolyester, comprising:
  repeat units from at least one aromatic, aliphatic, or alicyclic dicarboxylic acid, wherein the aromatic portion of said aromatic dicarboxylic acid has 6–20 carbon atoms, and wherein the aliphatic or alicyclic portion of said aliphatic or alicyclic dicarboxylic acid has 3–20 carbon atoms, and
  repeat units from at least one aliphatic glycol having 2–20 carbon atoms;
(b) 90–10% by weight of an aromatic polycarbonate of 4,4-isopropylidenediphenol (bisphenol-A); and
(c) 0.1 to about 2% by weight of a combination of aliphatic diphosphite and aromatic phosphite compounds,
wherein said aliphatic diphosphite has the following formula:

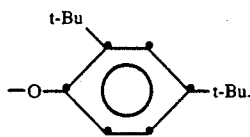

and wherein said aromatic phosphite has the following formula:

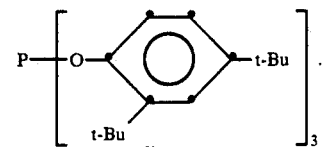

3. A thermoplastic molding composition comprising:
(a) 10–90% by weight of a polyester or a copolyester, comprising: repeat units from at least one aromatic, aliphatic, or alicyclic dicarboxylic acid, wherein the aromatic portion of said aromatic dicarboxylic acid has 6–20 carbon atoms, and wherein the aliphatic or alicyclic portion of said aliphatic or alicyclic dicarboxylic acid has 3–20 carbon atoms, and repeat units from at least one aliphatic glycol having 2–20 carbon atoms;
(b) 90–10% by weight of an aromatic polycarbonate of 4,4-isopropylidenediphenol (bisphenol-A); and
(c) 0.1 to about 2% by weight of a combination of aliphatic diphosphite and aromatic phosphite compounds,
wherein said aliphatic diphosphite has the following formula:

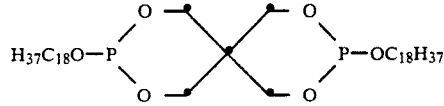

and wherein said aromatic phosphite has the following formula:

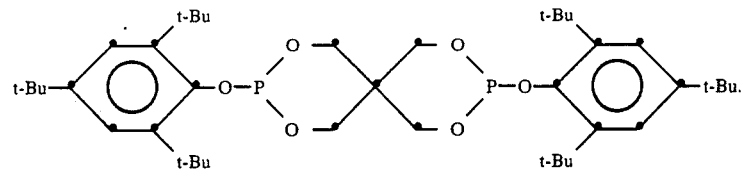

* * * * *